United States Patent
Yan et al.

(10) Patent No.: US 10,388,957 B2
(45) Date of Patent: Aug. 20, 2019

(54) LITHIUM ION BATTERY ELECTRODE

(71) Applicants: Tsinghua University, Beijing (CN); HON HAI PRECISION INDUSTRY CO., LTD., New Taipei (TW)

(72) Inventors: Ling-Jia Yan, Beijing (CN); Jia-Ping Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 163 days.

(21) Appl. No.: 15/638,322

(22) Filed: Jun. 29, 2017

(65) Prior Publication Data
US 2018/0026269 A1 Jan. 25, 2018

(30) Foreign Application Priority Data
Jul. 22, 2016 (CN) .......................... 2016 1 0584020

(51) Int. Cl.
*H01M 4/00* (2006.01)
*H01M 4/587* (2010.01)
*H01M 4/66* (2006.01)
*H01M 10/0525* (2010.01)
*H01M 4/583* (2010.01)
*H01M 10/052* (2010.01)

(52) U.S. Cl.
CPC .......... *H01M 4/587* (2013.01); *H01M 4/663* (2013.01); *H01M 10/0525* (2013.01); *H01M 4/5835* (2013.01); *H01M 10/052* (2013.01)

(58) Field of Classification Search
CPC .......................... H01M 4/587; H01M 10/0525; H01M 4/663; H01M 4/5835; H01M 10/052
See application file for complete search history.

(56) References Cited

U.S. PATENT DOCUMENTS

| | | | |
|---|---|---|---|
| 2010/0178543 A1* | 7/2010 | Gruner | B82Y 30/00 429/121 |
| 2011/0097512 A1* | 4/2011 | Zhou | H01B 1/04 427/545 |
| 2011/0256451 A1* | 10/2011 | Cui | B32B 5/26 429/218.1 |
| 2013/0171516 A1 | 7/2013 | Wang et al. | |

FOREIGN PATENT DOCUMENTS

CN 103187573 7/2013

\* cited by examiner

*Primary Examiner* — Nicholas P D'Aniello
(74) *Attorney, Agent, or Firm* — ScienBiziP, P.C.

(57) ABSTRACT

The present disclosure relates to a lithium ion battery electrode. The lithium ion battery electrode comprises a current collector and at least one electrode material layers stacked on the current collector. Each of the at least one electrode material layers comprises an electrode active material layer, a conductive agent, an adhesive material, and a carbon nanotube layered structure. The conductive agent and the adhesive material are dispersed in the electrode active material layer. The carbon nanotube layered structure is located on the electrode active material layer, and at least part of the carbon nanotube layered structure is embedded in the electrode active material layer. The electrode active material layer is located between the current collector and the carbon nanotube layered structure.

15 Claims, 12 Drawing Sheets

LITHIUM ION BATTERY ELECTRODE

CROSS-REFERENCE TO RELATED APPLICATIONS

This application claims all benefits accruing under 35 U.S.C. § 119 from China Patent Application No. 201610584020.7, filed on Jul. 22, 2016, in the China Intellectual Property Office, the contents of which are hereby incorporated by reference. The application is also related to copending applications entitled, "METHOD FOR MAKING LITHIUM ION BATTERY ELECTRODE", filed Jun. 29, 2017.

FIELD

The present disclosure relates to lithium ion battery electrodes.

BACKGROUND

Lithium ion battery has a high power and a high energy density, which has been widely used in mobile phones, digital cameras and notebook computers. Electrode active material used in lithium ion battery electrode has a great influence on the lithium ion battery.

However, electrode active material often has poor conductivity. The conductivity of the electrode active material can be improved by dispersing conductive agents in the electrode active material. A plurality of channels can be formed by the conductive agents between electrode active material particles, thus, electrons can be transferred between the electrode active material particles. However, the electrode active materials particles far away from a current collector can not transmit electrons and ions in time, as such, charge accumulation, polarization phenomenon, or uneven distribution of surface potential will be occurred. Therefore, a utilization rate of the current electrode active materials is low.

BRIEF DESCRIPTION OF THE DRAWINGS

Implementations of the present technology will now be described, by way of example only, with reference to the attached figures, wherein.

DETAILED DESCRIPTION

Figure 1:
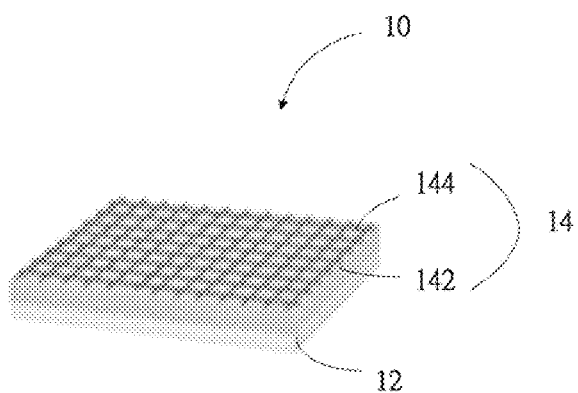
FIG. 1 is a structure schematic view of one embodiment of a lithium ion battery electrode.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Referring to FIG. 1, one embodiment is described in relation to a lithium ion battery electrode 10. The lithium ion battery electrode 10 comprises a current collector 12 and an electrode material layer 14. The electrode material layer 14 is located on a surface of the current collector 12. The electrode material layer 14 comprises an electrode active material layer 142 and a carbon nanotube layered structure 144. The electrode active material layer 142 comprises an electrode active material, a conductive agent (not shown), and an adhesive material (not shown). The conductive agent and the adhesive material are uniformly dispersed in the electrode active material. A surface of the electrode active material layer 142 directly contact with the current collector 12 and is defined as a first surface. A surface of the electrode active material layer 142 opposite to the first surface is defined as a second surface. The carbon nanotube layered structure 144 is located on the second surface, and at least part of the carbon nanotube layered structure 144 is embedded in the electrode active material layer 142.

The current collector 12 is used to derive a current generated by the lithium ion battery electrode 10 to an external circuit. The current collector 12 can be a metal sheet. The metal sheet can be copper foil, aluminum foil or the like. A thickness of the metal sheet can be ranged from about 20 micrometers to about 40 micrometers. A shape of the metal sheet can be rectangular, square, or circular. In one embodiment, the metal sheet is a rectangular aluminum foil, and a thickness of the rectangular aluminum foil is about 20 micrometers.

The electrode active material can be a positive electrode active material or a negative electrode active material. The positive electrode active material comprises lithium iron phosphate ($LiFePO_4$), lithium nickel cobalt ($LiNi_{0.8}Co_{0.2}O_2$), lithium nickel manganese cobalt ($LiNi_{1/3}Co_{1/3}Mn_{1/3}O_2$), lithium cobalt oxide ($LiCoO_2$) or combination thereof. The negative electrode active material comprises lithium titanate ($LiTiO_2$), graphite or combination thereof. In one embodiment, the electrode active material is the positive electrode active material, and the positive electrode active material is $LiCoO_2$. A thickness of the electrode active material layer 142 ranges from about 20 micrometers to about 40 micrometers.

A material of the conductive agent comprises carbon fiber, acetylene black, flake graphite KS6, carbon nanotube or combination thereof. When the conductive agent is carbon nanotube, as the carbon nanotube layered structure 144 comprises carbon nanotube material, both the electrode active material layer 142 and the carbon nanotube layered structure 144 comprise carbon nanotube material, thus, a contact resistance between the electrode active material layer 142 and the carbon nanotube layered structure 144 is small. Therefore, a conductive performance of the lithium ion battery electrode 10 can be improved. In one embodiment, the material of the conductive agent is acetylene black.

In one embodiment, a weight percentage between the conductive agent and the electrode active material layer 142 is ranged from about 1% to about 5%. In another embodiment, the weight percentage between the conductive agent and the electrode active material layer 142 is about 2%.

The adhesive material can be fluorine resins or polyolefin compounds. The polyolefin compounds can be polyvinylidene fluoride (PVDF), polytetrafluoroethylene (PTFE), styrene butadiene rubber, or combination thereof. In one embodiment, the adhesive material is PVDF.

A weight ratio between the adhesive material and the electrode active material can be in a range from about 1:7 to about 1:9. In one embodiment, the weight ratio between the adhesive material and the electrode active material is about 1:8.

The carbon nanotube layered structure 144 can be a carbon nanotube film 146 or at least two carbon nanotube films 146 arranged side by side with each other. The carbon nanotube layered structure 144 can also be at least two carbon nanotube films 146 stacked with each other. The at least two carbon nanotube films 146 are tightly joined together by van der Waals forces. In one embodiment, the at least two carbon nanotube films 146 crossed with each other, and an angle between adjacent carbon nanotube films is about 90 degrees. In another embodiment, the carbon nanotube layered structure 144 comprises two carbon nanotube films 146 stacked and crossed with each other, an angle between the two carbon nanotube films 146 is about 90 degrees.

In one embodiment, a weight ratio between the carbon nanotube layered structure 144 and the electrode material layer 14 is less than 0.02%. In another embodiment, the weight ratio between the carbon nanotube layered structure 144 and the electrode material layer 14 is less than 0.01%.

The carbon nanotube film 146 consists of a plurality of carbon nanotubes. An end of one carbon nanotube is joined to an end of an adjacent carbon nanotube by van der Waals force. In one embodiment, the carbon nanotube film 146 is a drawn carbon nanotube film. A large number of carbon nanotubes in the drawn carbon nanotube film are oriented along a preferred direction, meaning that a large number of the carbon nanotubes in the drawn carbon nanotube film are arranged substantially along a same direction. A minority of carbon nanotubes in the drawn carbon nanotube film may be randomly aligned. However, the number of randomly aligned carbon nanotubes is very small and does not affect the overall oriented alignment of the majority of carbon nanotubes in the drawn carbon nanotube film.

At least part of the carbon nanotube layered structure 144 is embedded in the electrode active material layer 142, and the carbon nanotube layered structure 144 is not completely immersed by the electrode active material layer 142. Along a thickness direction of the carbon nanotube layer structure 144, the carbon nanotube layer structure 144 consists of a first portion and a second portion. Along the thickness direction of the carbon nanotube layer structure 144, the first portion is located outside the electrode active material layer 142, and the second portion is inserted in the electrode active material layer 142 and is not exposed from the electrode active material layer 142. Thus, the carbon nanotube layer structure 144 is separated from the current collector 12.

Figure 2:
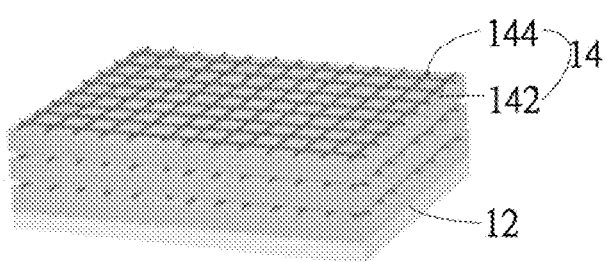
FIG. 2 is a structure schematic view of another embodiment of a lithium ion battery electrode.
Figure 3:
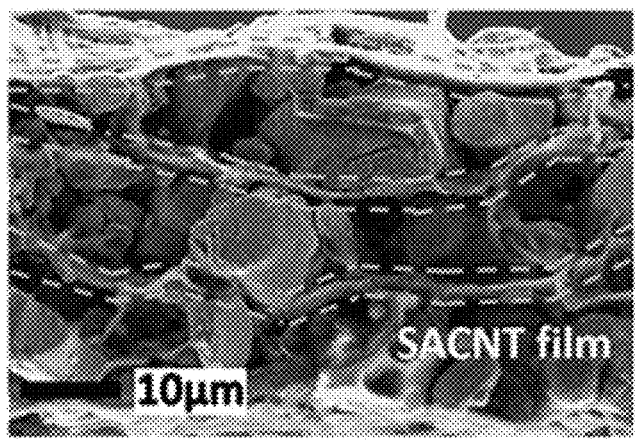
FIG. 3 is a scanning electron microscope image of one embodiment of a lithium ion battery electrode profile.

Referring to FIGS. 2 and 3, in one embodiment, the lithium ion battery electrode 10 comprises at least two electrode material layers 14, and the carbon nanotube layered structures 144 in adjacent electrode material layers 14 are separated from each other via the electrode active material layer.

Figure 4:
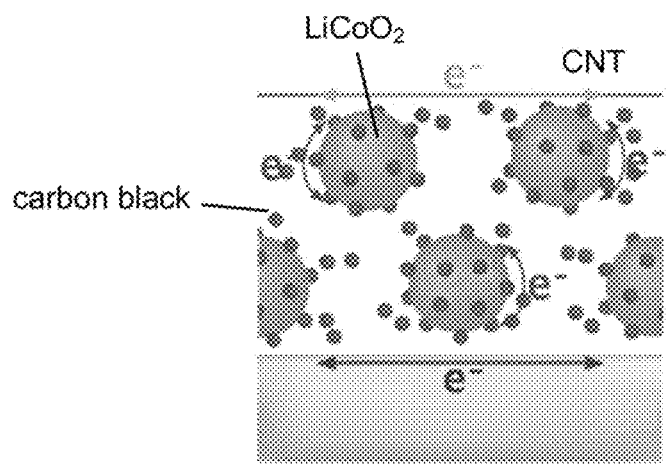
FIG. 4 is a structure schematic view of one embodiment of a conductive path of an electrode active material layer.

Referring to FIG. 4, the current collector 12 is an aluminum foil, the conductive agent is carbon black, and the electrode active material layer 142 is $LiCoO_2$. A plurality of long electron channels can be formed by the carbon nanotube layered structure 144 on the second surface of the electrode active material layer 142. The electrons in the electrode active material layer 142 far away from the current collector 12 are rapidly transferred to the conductive agent by the plurality of long electron channels. A plurality of short electron channels can be formed by the conductive agent between electrode active material particles of the electrode active material layer 142. The electrons can be transferred from surfaces of the electrode active material particles to the current collector 12. Therefore, charge accumulation, polarization phenomenon, or uneven distribution of surface potential can be avoided. An addition amount of the conductive agent can be reduced by the carbon nanotube layered structure 144, thus, an energy density reduction of the lithium ion battery electrode due to an excessive addition of the conductive agent can be avoided.

Figure 5:
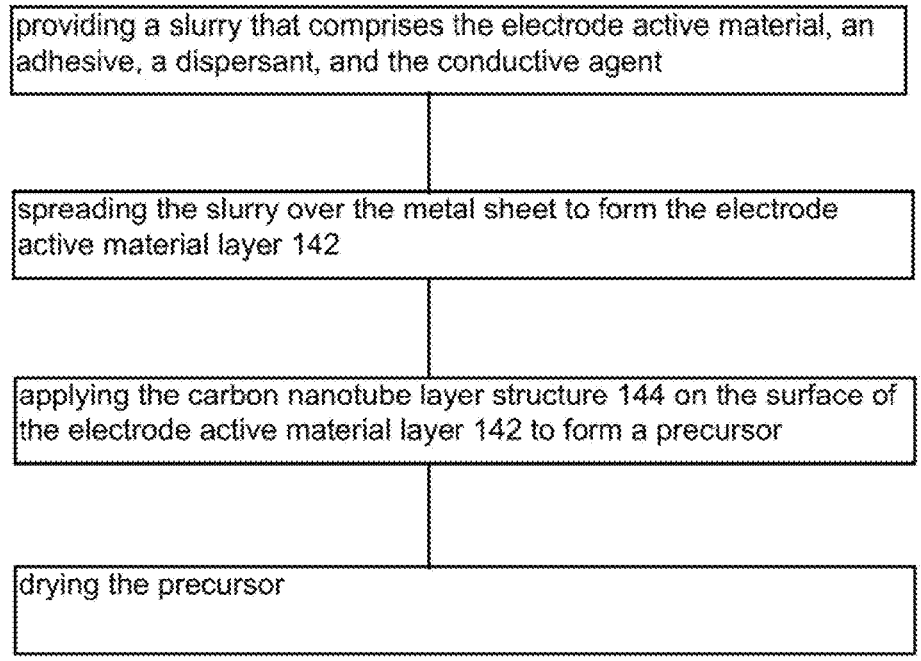
FIG. 5 is a flow chart of one embodiment of a method for making the lithium ion battery electrode.

Referring to FIG. 5, one embodiment is described in relation to a method for making the lithium ion battery electrode 10. The method comprises the following steps:

step (S1), providing a slurry that comprises the electrode active material, an adhesive, a dispersant, and the conductive agent;

step (S2), spreading the slurry over the metal sheet to form the electrode active material layer 142;

step (S3), applying the carbon nanotube layer structure 144 on the surface of the electrode active material layer 142 to form a precursor; and step (S4), drying the precursor.

In step (S1), the adhesive comprises the adhesive material and the solvent. The adhesive material is uniformly dispersed in the solvent to form an adhesive in a suspension state or an adhesive in a solution state. The adhesive material can be fluorine resins or polyolefin compounds. The polyolefin compounds can be polyvinylidene fluoride (PVDF), polytetrafluoroethylene (PTFE), styrene butadiene rubber, or combination thereof. The solvent can be ethanol, glycol, N-Methyl Pyrrolidone (NMP), water or combination thereof. A weight ratio of the adhesive material in the adhesive can be in a range from about 5% to about 60%. In one embodiment, the adhesive material is PVDF, the solvent is water, and the weight ratio of the adhesive material in the adhesive is about 20%.

In the slurry, a weight ratio between the adhesive material and the electrode active material is in a range from about 1:7 to about 1:9. In one embodiment, the weight ratio between the adhesive material and the electrode active material is about 1:8.

In one embodiment, the dispersant is N-methyl-2-pyrrolidone (NMP).

A method for making the slurry comprises the following steps: step (S11), providing the electrode active material, the adhesive, the dispersant, and the conductive agent; step (S12), mixing the conductive agent and the electrode active material uniformly to obtain a mixture; and step (S13), adding the adhesive and the dispersant into the mixture and stirring them to form the slurry.

In step (S12), the conductive agent and the electrode active material can be mixed in a mortar and pestle for about 20 minutes to obtain the mixture. In one embodiment, a weight percentage between the conductive agent and the electrode active material can be ranged from about 1% to about 5%. In another embodiment, the weight percentage between the conductive agent and the electrode active material is about 2%

In step (S2), the metal sheet is used as the current collector 12. The current collector 12 is used to derive a current generated by the lithium ion battery electrode to an external circuit.

In step (S3), the electrode active material layer 142 on the metal sheet remains in a slurry state, that is, the carbon nanotube layer structure 144 is applied on the surface of the electrode active material layer 142 when the electrode active material layer 142 is in the slurry state. At least part of the carbon nanotube layered structure 144 is embedded in the electrode active material layer 142, and the carbon nanotube layered structure 144 is not completely immersed by the electrode active material layer 142. Along a thickness direction of the carbon nanotube layer structure 144, the carbon nanotube layer structure 144 consists of a first portion and a second portion. The first portion is located outside the electrode active material layer 142, and the second portion is located in the electrode active material layer 142 and is not exposed from the electrode active material layer 142. Thus, the carbon nanotube layer structure 144 is separated from the metal sheet.

Figure 6:
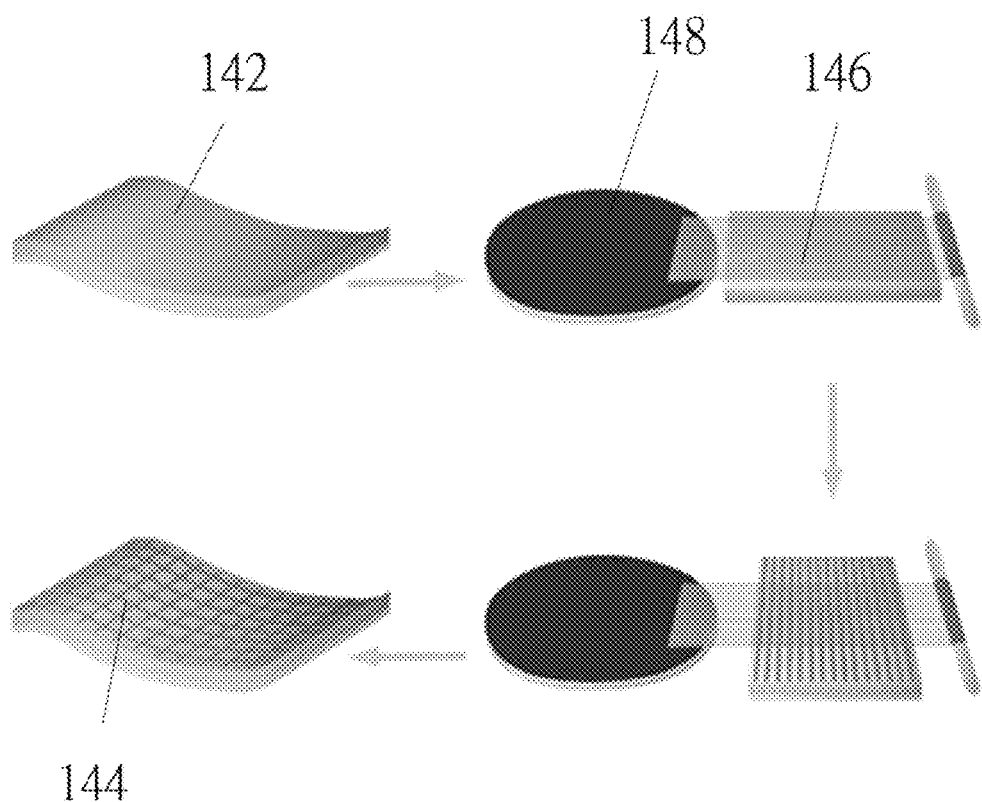
FIG. 6 is a schematic view of one embodiment of a method for making the lithium ion battery electrode.

Referring to FIG. 6, the carbon nanotube film 146 is drawn from a carbon nanotube array 148 via a stretch tool. The carbon nanotube film 146 is directly laid on the electrode active material layer 142 after drawn from the carbon nanotube array 148. In one embodiment, a height of the carbon nanotube array 148 is about 300 micrometers. A diameter of the carbon nanotubes of the carbon nanotube array 148 can range from about 20 nanometers to about 30 nanotubes. A method of the drawn carbon nanotube film is taught by U.S. Pat. No. 8,048,256 to Feng et al.

When the carbon nanotube layer structure 144 comprises more than two carbon nanotube films 146, a method of applying the carbon nanotube layer structure 144 on the surface of the electrode active material layer 142 comprises the following steps: step (S31), laying a first carbon nanotube film on a surface of the slurry; step (S32), laying a second carbon nanotube film on a surface of the first carbon nanotube film, wherein a first extending direction of the carbon nanotubes in the first carbon nanotube film intersects with a second extending direction of the carbon nanotubes in the second carbon nanotube film; step (S33), laying a third carbon nanotube film on a surface of the second carbon nanotube film, wherein a third extending direction of the carbon nanotubes in the third carbon nanotube film intersects with the second extending direction of the carbon nanotubes in the second carbon nanotube film; and step (S34) repeating above steps. When the carbon nanotube layer structure 144 comprises two carbon nanotube films 146, the method of applying the carbon nanotube layer structure 144 on the surface of the electrode active material layer 142 only comprises step (S31) and step (S32). In one embodiment, first, the first carbon nanotube film is laid on the surface of the electrode active material layer 142, and the carbon nanotubes in the first carbon nanotube film extend in a longitudinal direction of the metal sheet; and the second carbon nanotube film is laid on the surface of the first carbon nanotube film, the carbon nanotubes in the second carbon nanotube film extend in a width direction of the metal sheet.

In one embodiment, in step (S3), after applying the carbon nanotube layer structure 144 on the surface of the electrode active material layer 142, steps S2 and S3 are repeated again on the surface of the carbon nanotube layer structure 144. That is, spreading the slurry over the carbon nanotube layered structure 144 to form a second electrode active material layer; then applying a second carbon nanotube layer structure on the second electrode active material layer; and repeat such steps until a thickness of the precursor satisfies an actual requirement. The second electrode active material layer is the same as the electrode active material layer 142, and second carbon nanotube layer structure is the same as the carbon nanotube layer structure 144. Adjacent carbon nanotube layered structures are separated from each other via the electrode active material layer. In one embodiment, first, a first slurry is spread on the metal sheet, and a first carbon nanotube layered structure is laid on the first slurry; second, a second slurry is spread on the first carbon nanotube layered structure, and a second carbon nanotube layered structure is laid on the second slurry; finally, a third slurry is spread on the second carbon nanotube layered structure, and a third carbon nanotube layered structure is laid on the third slurry. The first slurry, the second slurry, and the third slurry are the same as the slurry in step (S1). When the lithium ion battery electrode is thick, the electrodes contain a carbon nanotube layer structure at a certain interval, a long conductive path can be formed by the carbon nanotube layered structure in all directions in the electrode active material, the electrons on the surface of the electrode active material can be transferred out in time. Therefore, charge accumulation, polarization phenomenon, or uneven distribution of surface potential can be avoided.

In step (S4), a method of drying the precursor comprising the steps of: placing the precursor in a normal pressure oven and drying the precursor at about 60° C. for about 10 minutes to about 30 minutes; and then placing the precursor in a vacuum oven and drying the precursor at about 120° C. for about 18 hours to about 24 hours. The step of drying the precursor is to remove the dispersant in the precursor and the solvent in the adhesive. In one embodiment, placing the precursor in the normal pressure oven and drying the precursor at about 60° C. for about 30 minutes; and then placing the precursor in a vacuum oven and drying the precursor at about 120° C. for about 24 hours.

Example 1

The lithium ion battery electrode comprises the current collector 12 and the electrode material layer 14. The current collector 12 is made of aluminum foil. The electrode active material layer 142 consists of $LiCoO_2$ particles with a diameter of about 10 millimeters. The thickness of the electrode active material layer 142 is about 30 micrometers. The conductive agent is carbon black having a diameter of about 50 nanometers, and the weight percentage between the carbon black and the electrode active material layer 142 is about 2%. The adhesive is PVDF, and the weight ratio of the adhesive and the electrode active material layer 142 is about 1:8. The carbon nanotube layered structure 144 comprises two carbon nanotube films 146 stacked and crossed with each other, and the angle between the two carbon nanotube films 146 is about 90 degrees.

Example 2

In this example, the lithium ion battery electrode is the same as that in Example 1, except that the lithium ion battery electrode comprises a three-layer electrode material layer laminated on the current collector 12.

Comparative Example 1

In this comparative example, the lithium ion battery electrode is the same as that in Example 1, except that the lithium ion battery electrode does not comprises the carbon nanotube layered structure.

A lithium foil is as reference electrode. A porous polymer film (Celgard 2400, USA) is used as separator, and 1 M $LiPF_6$ is dissolved in a mixture of ethylene carbonate (EC) and diethyl carbonate (DEC) with a volume ratio of 1:1 is used as electrolyte. The lithium ion battery electrode in Example 1, Example 2 and Comparative Example 1 is used as electrode respectively. Coin-type cells (2016 size) are assembled in an argon glove box with both moisture content and oxygen content is less than 0.1 ppm. The battery performance tests are performed at a room temperature in a range from about 3.0V to about 4.3V. The coin-type cell comprises the lithium ion battery electrode of Example 1 is defined as a first coin-type cell. The coin-type cell comprises the lithium ion battery electrode of Example 2 is defined as a second coin-type cell. The coin-type cell comprises the lithium ion battery electrode of Comparative Example 1 is defined as a third coin-type cell.

Figure 7:
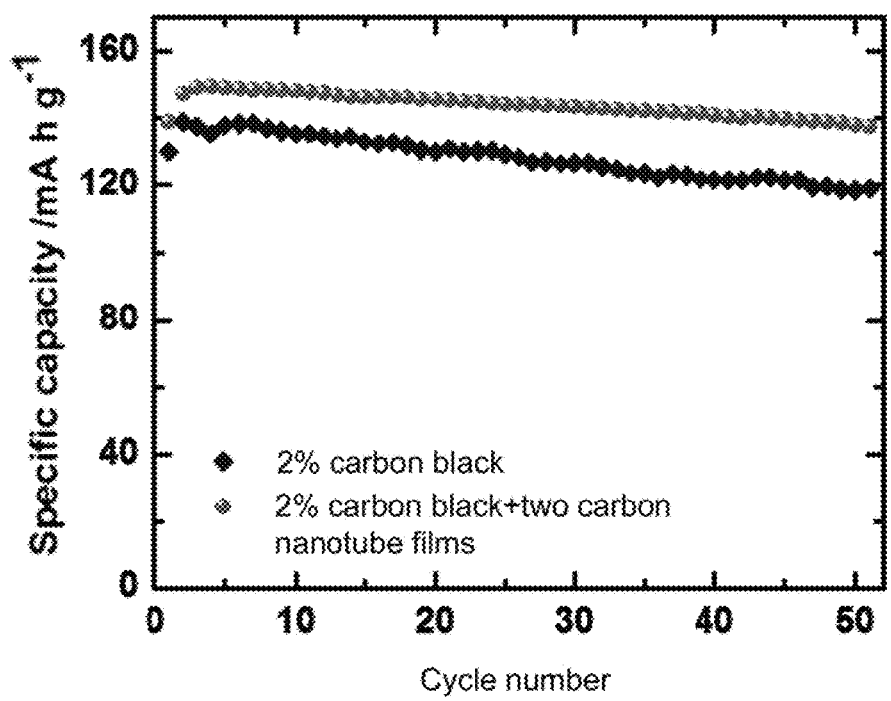
FIG. 7 is constant current charge-discharge test curves of the lithium ion battery electrode of Example 1 and the lithium ion battery electrode of Comparative Example 1.

Referring to FIG. 7, after a charge and discharge cycle is performed 50 times, a discharge capacity retention ratio of the lithium ion battery electrode of Example 1 is 92% or more; however, a discharge capacity retention ratio of the lithium ion battery electrode of Comparative Example 1 is only 85.3%. That is, the capacity and the capacity retention ratio of the lithium ion battery electrode of Example 1 are greatly improved compared with the lithium ion battery electrode of Comparative Example 1.

Figure 8:
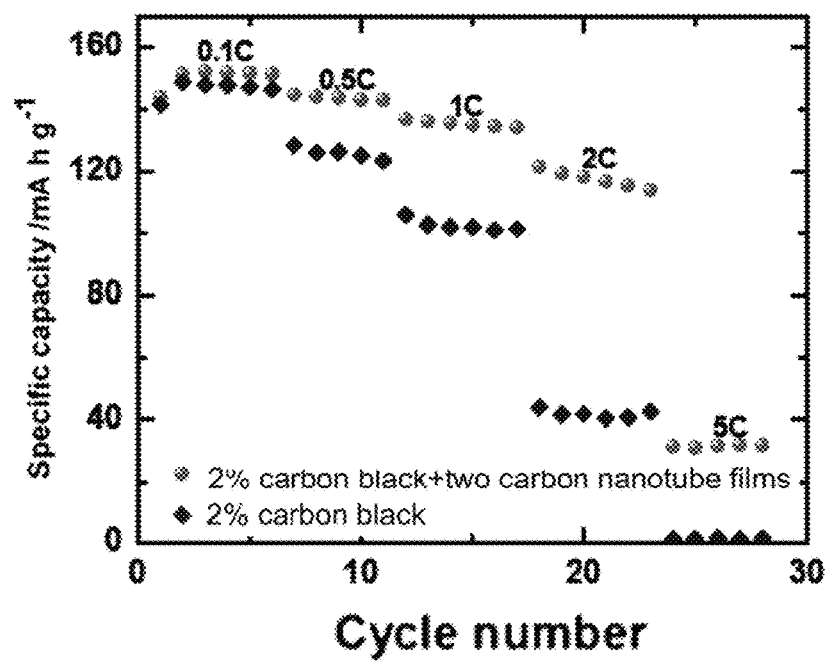
FIG. 8 is charge-discharge cycle test curves at different magnification of the lithium ion battery electrode of Example 1 and the lithium ion battery electrode of Comparative Example 1.

Referring to FIG. 8, after the first coin-type cell and the third coin-type cell are both charged at a constant rate of 0.1 C, then discharged at 0.5 C, 1 C, 2 C, and 5 C respectively. It can be seen that a discharge capacity of the lithium ion battery electrode of Example 1 is higher than that of Comparative Example 1, and a battery capacity attenuation ratio of the lithium ion battery electrode of Example 1 is smaller than that of the lithium ion battery electrode of Example 1.

Figure 9:
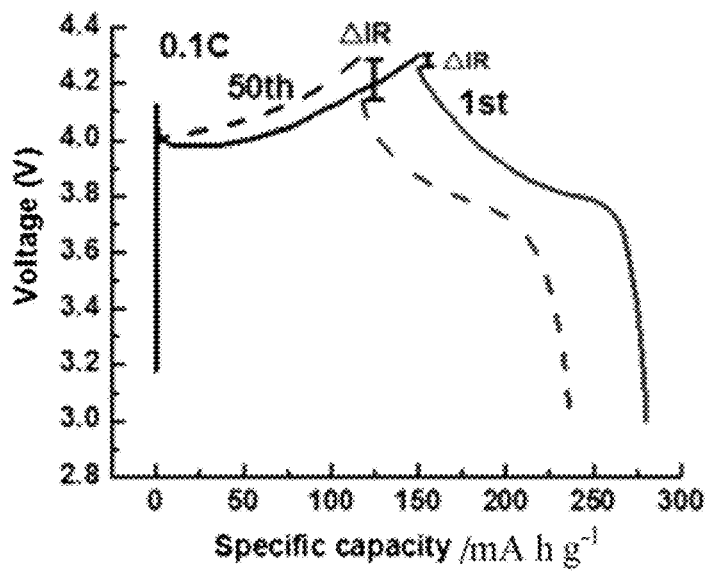
FIG. 9 is a voltage drop curve of the lithium ion battery electrode of Example 1.
Figure 10:
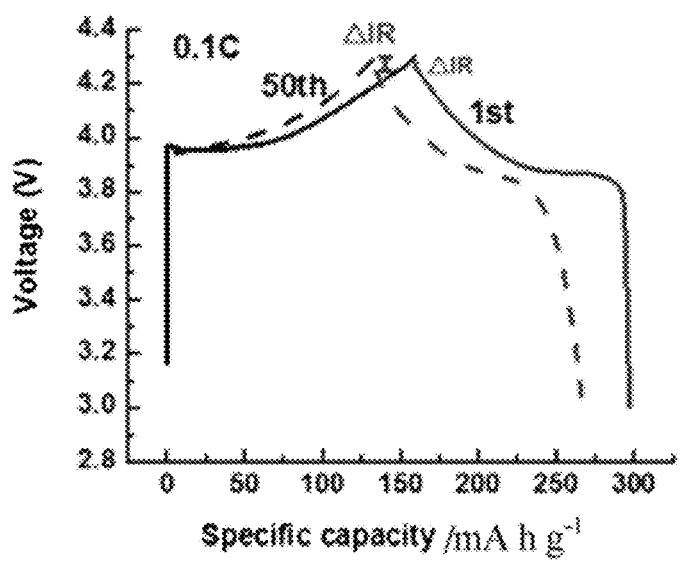
FIG. 10 is a voltage drop curve of the lithium ion battery electrode of Comparative Example 1.

Referring to FIGS. 9 and 10, it can be seen that after one (1st) charge and discharge cycle, a voltage drop of the lithium ion battery electrode of Example 1 is not much different from that of Comparative Example 1. After fifty (50th) charge and discharge cycles, the voltage drop of the lithium ion battery electrode of Example 1 is small, however, the voltage drop of the lithium ion battery electrode of Example 1 is lowered by 0.159V. Therefore, an internal resistance of the lithium ion battery electrode of Example 1 is small, and the electrochemical performance is better under a large magnification cycle.

Figure 11:
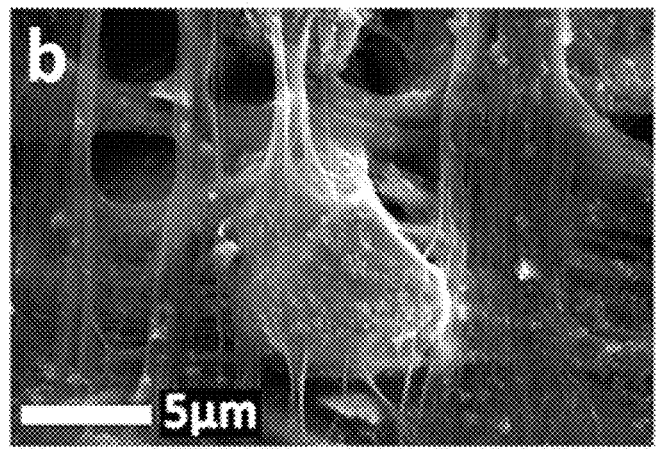
FIG. 11 is a surface morphology of the lithium ion battery electrode of Example 1.

Referring to FIG. 11, it can be seen that the carbon nanotube layered structure is evenly spread over the electrode active material layer and extends in all directions like a mesh structure. Thus the $LiCoO_2$ particles on the surface of the electrode active material layer can be electrically connected.

Figure 12:
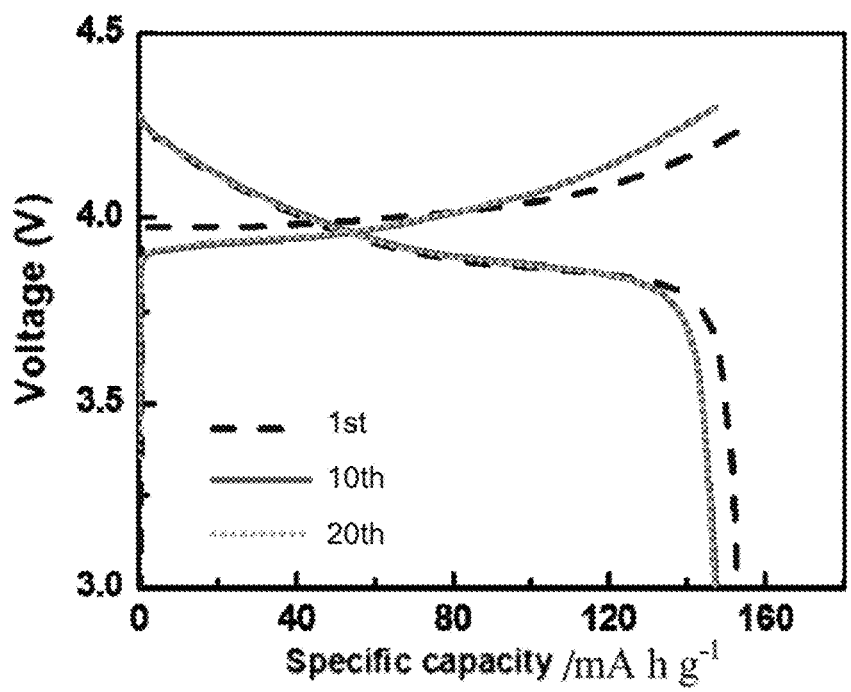
FIG. 12 is charge-discharge curves under different cycles of the lithium ion battery electrode of Example 2.

Referring to FIG. 12, it can be seen that a magnification discharge curve of the lithium ion battery electrode of Example 2 after cycling 10 times is substantially coincide with that of the lithium ion battery electrode of Example 2 after cycling 20 times. The discharge capacities of the lithium ion electrode are 152.6 mA h $g^{-1}$, 147.3 mA h $g^{-1}$, 146.9 mA h $g^{-1}$ respectively after one cycle, ten cycles and twenty cycles. The lithium ion electrode has obvious three-electron charge and discharge platform after one cycle, ten cycles and twenty cycles. Thus, the lithium ion battery electrode of Example 2 has a high discharge capacity and excellent cycle stability.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A lithium ion battery electrode comprising:
   a current collector having a surface; and
   at least one electrode material layer stacked on the surface, wherein each of the at least one electrode material layer comprises:
     an electrode active material layer comprising an electrode active material, a conductive agent and an adhesive material, wherein the conductive agent and the adhesive material are dispersed in the electrode active material; and
     a carbon nanotube layered structure located on the electrode active material layer, and at least part of the carbon nanotube layered structure is embedded in the electrode active material layer,
   wherein the carbon nanotube layered structure consists of drawn carbon nanotube films, each of the drawn carbon nanotube films consists of a plurality of carbon nanotubes arranged substantially along the same direction, the carbon nanotube layer structure is separated from the current collector, the electrode active material layer of one of the at least one electrode material layers is directly contact with the current collector.

2. The lithium ion battery electrode of claim 1, wherein along a thickness direction of the carbon nanotube layer structure, the carbon nanotube layer structure consists of a first portion and a second portion; the first portion is located outside the electrode active material layer, and the second portion is inserted in the electrode active material layer.

3. The lithium ion battery electrode of claim 1, wherein the carbon nanotube layered structure consists of at least two drawn carbon nanotube films arranged side by side with each other.

4. The lithium ion battery electrode of claim 1, wherein the carbon nanotube layered structure consists of at least two drawn carbon nanotube films stacked and crossed with each other.

5. The lithium ion battery electrode of claim 4, wherein an angle between adjacent carbon nanotube films of the at least two drawn carbon nanotube films is about 90 degrees.

6. The lithium ion battery electrode of claim 1, wherein a weight ratio between the carbon nanotube layered structure and the electrode material layer is less than 0.02%.

7. The lithium ion battery electrode of claim 6, wherein the weight ratio between the carbon nanotube layered structure and the electrode material layer is less than 0.01%.

8. The lithium ion battery electrode of claim 1, wherein the lithium ion battery electrode comprises at least two electrode material layers, and the carbon nanotube layered structures in adjacent electrode material layers are separated from each other via the electrode active material layer.

9. The lithium ion battery electrode of claim 1, wherein a thickness of the electrode active material layer ranges from about 20 micrometers to about 40 micrometers.

10. The lithium ion battery electrode of claim 1, wherein a weight percentage between the conductive agent and the electrode active material layer is ranged from about 1% to about 5%.

11. The lithium ion battery electrode of claim 10, wherein the weight percentage between the conductive agent and the electrode active material layer is about 2%.

12. The lithium ion battery electrode of claim 1, wherein the conductive agent is carbon nanotube.

13. The lithium ion battery electrode of claim 1, wherein a weight ratio between the adhesive material and the electrode active material layer is in a range from about 1:7 to about 1:9.

14. The lithium ion battery electrode of claim 13, wherein the weight ratio between the adhesive material and the electrode active material is about 1:8.

15. A lithium ion battery electrode comprising:
a current collector having a surface; and
at least two electrode material layers stacked on the surface, wherein each of the at least two electrode material layers comprises:
an electrode active material layer comprising an electrode active material, a conductive agent and an adhesive material, wherein the conductive agent and the adhesive material are dispersed in the electrode active material; and
a carbon nanotube layered structure located on the electrode active material layer, and at least part of the carbon nanotube layered structure is embedded in the electrode active material layer,
wherein the carbon nanotube layered structure consists of drawn carbon nanotube films, each of the drawn carbon nanotube films consists of a plurality of carbon nanotubes arranged substantially along the same direction, the carbon nanotube layer structure is separated from the current collector, the electrode active material layer of one of the at least two electrode material layers is directly contact with the current collector, and the carbon nanotube layered structures in adjacent electrode material layers are separated from each other via the electrode active material layer.

* * * * *